United States Patent [19]

Araki

[11] 4,430,660
[45] Feb. 7, 1984

[54] PEN DRIVING MECHANISM

[75] Inventor: Shigeru Araki, Tamayama, Japan

[73] Assignee: Alps Electric Co., Ltd., Tokyo, Japan

[21] Appl. No.: 359,849

[22] Filed: Mar. 19, 1982

[30] Foreign Application Priority Data

Mar. 19, 1981 [JP] Japan .................................. 56-38646

[51] Int. Cl.³ .......................................... G01D 13/16
[52] U.S. Cl. ............................................... 346/139 R
[58] Field of Search ................ 346/29, 104, 139, 140, 346/141

[56] References Cited

U.S. PATENT DOCUMENTS

| | | | |
|---|---|---|---|
| 2,032,991 | 3/1936 | Lange | 346/140 |
| 2,375,820 | 5/1945 | Ridings et al. | 346/139 C |
| 2,644,738 | 7/1953 | Gardner | 346/139 R UX |
| 3,079,604 | 2/1963 | Schwarzer | 346/139 X |
| 4,150,902 | 4/1979 | Brescia | 400/17 |
| 4,233,609 | 11/1980 | Hubbard | 346/140 A |
| 4,258,369 | 3/1981 | Hagiwara et al. | 346/62 |
| 4,274,102 | 6/1981 | Lum | 346/139 R |

FOREIGN PATENT DOCUMENTS 1141050  3/1957  France .................................. 346/141

Primary Examiner—Donald A. Griffin
Attorney, Agent, or Firm—Guy W. Shoup; Gerard F. Dunne

[57] ABSTRACT

A mechanism for driving a recording pen in an automatic drafting machine, an X-Y plotter, etc., comprising a moving coil which is operated unitarily with the recording pen, magnetic circuits in which a center pole, permanent magnets and legs are arranged so as to interlink magnetic fluxes to the moving coil, a holder which holds the recording pen, and a supporting shaft and bearings which support the holder, the moving coil being supplied with current to drive the recording pen.

12 Claims, 5 Drawing Figures

PEN DRIVING MECHANISM

BACKGROUND OF THE INVENTION

The present invention relates to a moving-coil type actuator for vertically driving a recording pen in an automatic drafting machine, an X-Y plotter, etc. More particularly, it relates to an improved pen driving mechanism which employs a cylindrical moving coil.

As will be described in detail later, a conventional pen driving mechanism employs a flat moving coil. This leads to the disadvantages that the pen driving mechanism becomes large in size, that a portion operating unitarily with a pen becomes heavy in weight and that the job of winding the moving coil is inferior in efficiency. Improvements in the mechanism have therefore been desired.

SUMMARY OF THE INVENTION

An object of the present invention is to provide a pen driving mechanism which is free from the above-mentioned disadvantages.

According to one aspect of performance of the present invention, a pen driving mechanism for driving and controlling a recording pen relative to a recording surface comprises a moving coil which actuates the recording pen, magnetic circuits which are arranged so as to interlink magnetic fluxes to said moving coil, a holder which holds said recording pen, and a supporting device which supports said holder, said moving coil being supplied with current to drive said recording pen.

DETAILED DESCRIPTION OF THE INVENTION

Figure 1:
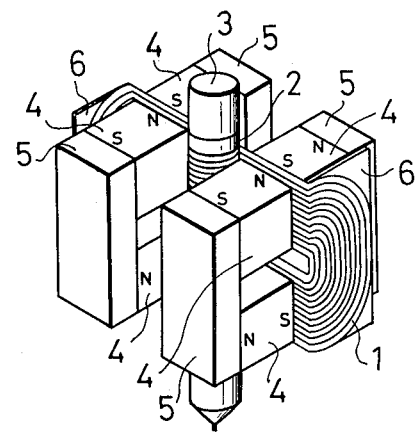
FIG. 1 is a perspective view showing a moving-coil type pen raising and lowering mechanism of the prior art.
Figure 2:
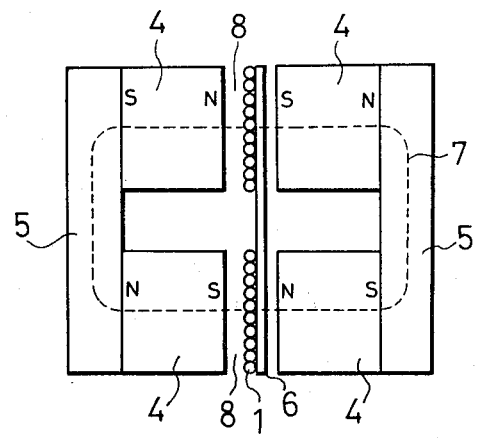
FIG. 2 is an explanatory view showing the magnetic circuit of the prior-art mechanism shown in FIG. 1.

Before the description of the preferred embodiment of the present invention, a known moving-coil type pen driving mechanism will be explained with reference to FIGS. 1 and 2. In these figures, numeral 1 designates a moving coil, numeral 2 a holder in which a recording pen 3 is inserted, numeral 4 a permanent magnet, numeral 5 a yoke for forming a magnetic circuit, numeral 6 a holding plate which holds the moving coil 1, numeral 7 a magnetic path, and numeral 8 a gap. The two permanent magnets 4 are bonded and fixed to the yoke 5 in the shape of letter U, to construct half of the magnetic circuit. Such half magnetic circuits oppose each other with the gaps 8 defined therebetween, to construct one magnetic circuit. The magnetic poles of the permanent magnets 4 are arranged so as to establish the closed-loop magnetic path 7 having the two gaps 8. The holding plate 6 made of a nonmagnetic material is inserted in the gaps 8, and the moving coil 1 is wound flatly, in parallel, with the flux passage plane of the holding plate 6 so that the moving coil 1 and the magnetic flux may intersect orthogonally. The holding plate 6 and the holder 2 are made unitary, and the recording pen (hereinbelow, simply called "pen") 3 is fixed and held in the state in which it is inserted in the holder 2. A magnetic circuit is arranged on both the sides of the pen 3. Thus, the moving-coil type pen raising and lowering drive mechanism is constructed.

In the apparatus of such construction, when the moving coil 1 is supplied with current, an electromagnetic force according to the left-hand rule is induced in the moving coil 1 by the magnetic circuit constructed of the permanent magnets 4 and the yokes 5, and the holding plate 6 to which the moving coil 1 is attached is moved to cause the pen 3 to abut on a recording surface. When the current flowing through the moving coil 1 is reversed, the holding plate 6 returns to its original position. In this way, the pen 3 can be driven in the upward and downward directions by only the electromagnetic forces without using any return spring. In addition, when the pen 3 is covered to abut on the recording surface, the movement of the pen 3 can be effected with low noise and with a soft touch by the current control. A further merit is that, since the writing pressure of the pen 3 can be afforded directly by the electromagnetic force without using any spring or the like, the adjustment of the writing pressure can be facilitated.

Since the moving coil 1 is wound flatly, however, the proportion of the flux interlinkage relative to the whole coil is small, and the utilization efficiency is inferior. In order to generate a great force, as apparent from the left-hand rule $F = I\,B\,l$, the driving current I or the flux interlinkage coil length l needs to be made great, or alternatively, the magnetic circuit for increasing the flux density B needs to be made large in size. When the driving current I is made high, the quantity of heat generation increases to a disadvantage. When the flux interlinkage coil length l or the size of the magnetic circuit is made great, there is the disadvantage that the pen driving mechanism itself becomes large in size. In addition, since the moving coil 1 is formed on the holding plate 6, the weight of the portion which operates unitarily with the pen 3 increases, and the electromagnetic force F must be made greater to that extent.

Further, the moving coil 1 is wound in parallel with the flux passage surface of the flat holding plate 6. This leads to the disadvantage that the job efficiency is much inferior to that of a coil wound on a bobbin.

The present invention has eliminated the aforecited disadvantages, and employs a cylindrical moving coil, thereby to enhance the utilization efficiency of the coil and to permit low current control of the coil as well as the miniaturization of a magnetic circuit; in supporting a holder at one end thereof, thereby to stabilize the motion of a pen; and in winding the coil on a bobbin, thereby to enhance the assembling job efficiency of the coil.

Hereunder, the present invention will be described in detail with reference to FIGS. 3 and 4.

Figure 3:
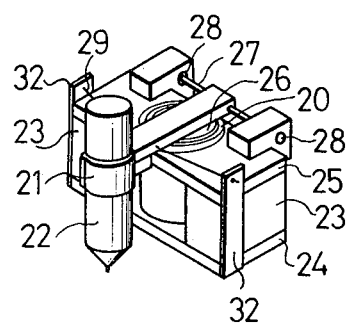
FIG. 3 is a perspective view showing an embodiment of the present invention.
Figure 4:
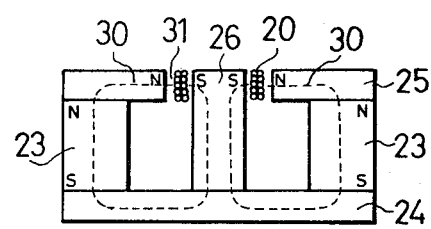
FIG. 4 is an explanatory view showing the magnetic circuits of the embodiment shown in FIG. 3.

FIG. 3 is a perspective view showing the structure of an embodiment of the present invention. Numeral 20 designates a cylindrical moving coil, numeral 21 a holder in which a pen 22 is inserted, numeral 23 a permanent magnet, numeral 24 a lower leg which constitutes a yoke for a magnetic circuit, numeral 25 an upper leg forming a yoke, numeral 26 a center pole, numeral 27 a supporting shaft which supports the holder 21 at one end thereof, numeral 28 a bearing for the supporting shaft 27, and numeral 29 a supporting spring which supports the holder 21 at its return point in the no-current condition. FIG. 4 shows the arrangement of magnetic circuits in the embodiment of the present invention. Numeral 30 indicates a magnetic path, and numeral 31 a gap. In the illustrated pen driving mechanism, the permanent magnets 23 are disposed on both ends of the lower leg 24 made of a magnetic material, the center pole 26 made of a magnetic material is disposed on the central portion of the lower leg 24, and the upper leg 25 made of a magnetic material is disposed on the permanent magnets 23 so as to form the gap 31 of any desired width between it and the center pole 26. The cylindrical moving coil 20 has been fabricated by winding a conductor on a bobbin as a single layer or a plurality of layers into the cylindrical shape and then stripping off only the resultant coil and soldifying it with a binder. The cylindrical moving coil 20 has its one end mounted on the holder 21 to be unitary with each other, so that the holder 21 moves with the movement of the cylindrical moving coil 20. One end of the holder 21 holds the pen 22 by a resilient force, while the other end is provided with a hole, in which the supporting shaft 27 is press-fitted. Both ends of the supporting shaft 27 are journaled in the bearings 28 which are mounted on the upper leg 25. In addition, on that side of the holder 21 which is close to the pen 22, there is provided a hole through which the supporting spring 29 is inserted. Both ends of the supporting spring 29 are attached to supporting pieces 32 which are mounted on the permanent magnets 23. The supporting shaft 27 and the supporting spring 29 determine the position of the holder 21. The supporting spring 29 also functions to maintain the holder 21 at its return or reset point in the state in which no current is caused to flow through the cylindrical moving coil 20.

The two permanent magnets 23 are bonded and fixed to the lower leg 24 and the upper leg 25, and the columnar or cylindrical center pole 26 is fixed to the lower leg 24 with screws or the like. The upper leg 25 is provided with a circular hole larger than the center pole 26 so that one end part of the center pole 26 may be inserted therein and that the upper leg 25 and the center pole 26 may define the gap 31. The cylindrical moving coil 20 is also inserted in the gap 31. The magnetic paths 30 are formed of the permanent magnets 23, the upper leg 25, the gap 31, the cylindrical moving coil 20, the center pole 26 and the lower leg 24, thereby to construct the two magnetic circuits. Magnets of an Fe—Cr—Co system are used as the permanent magnets, and the opposing areas of the upper leg 25 and the center pole 26 in the gap 31 are made small. Thus, the utilization efficiency of the magnets is enhanced, and the gap flux density can be made high.

In the pen driving mechanism of the above structure, when a driving current I is supplied to the cylindrical moving coil 20, a magnetic flux density B is established in the part of the gap 31 within the magnetic circuit constructed of the permanent magnet 23, lower leg 24, upper leg 25 and center pole 26, and an electromagnetic force F=I B l according to the left-hand rule is induced. The direction of the electromagnetic force F is a direction orthogonal to a plane containing both the current I and the magnetic flux $\phi$ and is the axial direction of the pen 22. Here, the cylindrical moving coil 20 is unitary with the holder 21 and the supporting shaft 27. Therefore, the electromagnetic force F in the axial direction of the pen 22 causes the holder 21 to perform an arcuate motion about the supporting shaft 27. On the other hand, when no driving current is supplied to the cylindrical moving coil 20, the holder 21 is maintained at the return point by the supporting spring 29.

Figure 5:
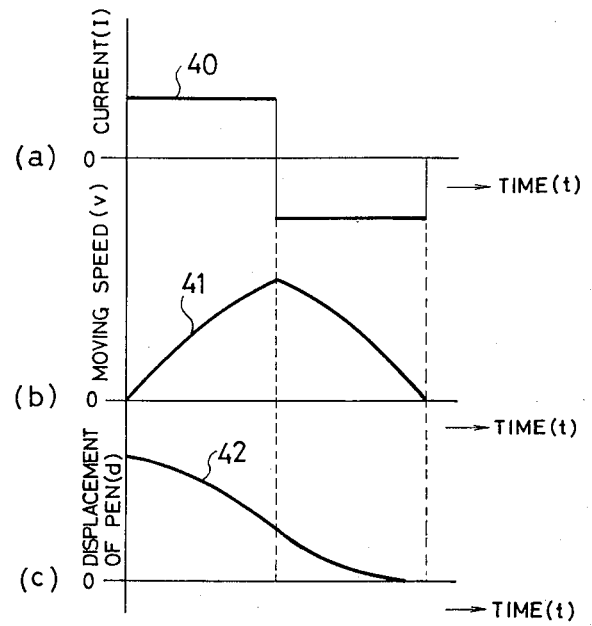
FIG. 5 is a time chart showing the situation of pen drive.

The pen 22 can be brought into soft touch with a recording surface by supplying current of a waveform as shown in FIG. 5 in order to drive the pen driving mechanism of the present invention. In FIG. 5, (a) is a current waveform diagram of the current to flow through the cylindrical moving coil 20, (b) is a time chart illustrative of the moving speed of the pen 22, and (c) is a time chart illustrative of the displacement of the pen 22. Numeral 40 indicates the current to flow through the cylindrical moving coil 20, numeral 41 the moving speed of the pen 22, and numeral 42 the displacement of the pen 22. The pen 20 is controlled to be accelerated and decelerated in such a way that the direction of the current to flow through the cylindrical moving coil 22 is switched to be forward and reverse. Thus, vibrations at the contact of the pen 20 with the recording surface are suppressed to shorten the operating time, and a shock on the recording surface is relieved to reduce noise. The switching time of the current can be appropriately set at will by the use of a control device such as microcomputer. This measure can be readily performed.

As set forth above, the present invention employs the moving coil which has been fabricated by winding the conductor on the bobbin, stripping off only the resultant coil from the bobbin and solidifying it with the binder. Therefore, the holding plate as in the prior art is dispensed with, so that the weight becomes light and that the job efficiency is enhanced. In addition, since the moving coil is cylindrical, the proportion of interlinkage between the moving coil and the magnetic flux is large, and the utilization efficiency of the coil is high, so that the magnetic circuit can be made small in size and that the cost and the power dissipation can be reduced.

Further, the moving coil and the holder are made unitary with, for example, a binder. Therefore, the holder and the moving coil can be reliably positioned by the supporting spring and the supporting shaft. In addition, the moving coil and the holder do not move to a great extent during the vertical motion of the pen and are free from problems of friction and wear. This is very effective to prolong life and to enhance reliability.

While, in the above, the embodiment of FIG. 3 has been referred to, the present invention is not restricted thereto. The cylindrical moving coil 20 can be replaced with a columnar moving coil in the shape of an elliptical column or square column or the like by causing the shapes of the upper leg 25 and the center pole 26 to correspond thereto. The magnetic circuit of FIG. 4 does not have its shape restricted, either.

It is also possible to change the permanent magnets 23 into yokes and to change the center pole 26 into a permanent magnet. The material of the permanent magnets 23 can be properly selected according to usage. In making the cylindrical moving coil 20 and the holder 21 unitary, the expedient of directly bonding them with the binder or the like can be replaced with an expedient in which the cylindrical moving coil 20 is bonded to a bobbin and this bobbin is fixed to the holder 21 by screws or the like. As the supporting spring 29, the wire spring can be replaced with a compression spring, a tension spring, a leaf spring, etc. Regarding the structure of the supporting shaft 27 and the bearings 28, the supporting spring 29 can be dispensed with when the one-end support of the holder 21 is executed with an elastic member.

What is claimed is:

1. A pen driving mechanism for driving and controlling a recording pen relative to a recording surface, comprising:
    a moving coil for actuating said recording pen;
    a pair of magnetic circuits arranged so as to interlink their magnetic fluxes to said moving coil;
    a holder member for holding said recording pen; and
    a supporting device for supporting said holder member;
    said moving coil being supplied with an electric current to drive said recording pen.

2. A pen driving mechanism according to claim 1, wherein said moving coil is formed of a cylindrically wound wire.

3. A pen driving mechanism according to claim 1, wherein said magnetic circuits include a core assembly comprising a lower leg of magnetic material horizontally disposed;
    a center pole orthogonally joined with said lower leg on the central portion thereof;
    a pair of permanent magnets joined respectively on both ends of said lower leg and in parallel to said center pole;
    a pair of upper legs of magnetic material each being orthogonally joined with each of said permanent magnets and extending adjacent said center pole; and a pair of gaps between said center pole and each end of said upper legs for receiving said moving coil to allow its vertical movement.

4. A pen driving mechanism according to claim 1, wherein said supporting device comprises a supporting shaft rotatably supported by a pair of bearing means with each end portion thereof.

5. A mechanism for moving a recording stylus towards a recording surface, comprising means including a holder for supporting said stylus for movement toward and away from said recording surface, a cylindrical coil of conductive material connected integrally with said holder, and magnetic means including a magnetic core element extending axially within said coil to establish a magnetic pole interiorly of said coil for producing magnetic lines of flux extending through said coil in a direction orthogonal to the axis thereof so that said coil may be moved axially to move said stylus by current flowing through said conductive material.

6. A mechanism according to claim 5, said magnetic means forming two magnetic circuits each directing lines of flux through said coil.

7. A mechanism according to claim 6, said magnetic means being formed by two permanent magnets arranged on respective sides of said coil, a first yoke member engaging said core element and a pole face of each permanent magnet having the same polarity, and a second yoke member extending from the other pole faces of said permanent magnets towards said coil which air gaps therebetween.

8. A mechanism according to claim 7, including means for flowing current intermittently through said conductive material so that the speed of movement of said stylus can be regulated.

9. A mechanism according to claim 8, said means for flowing current serving to intermittently reverse the direction thereof.

10. A mechanism according to claim 6, said core element being a permanent magnet, said coil being positioned near one pole of said permanent magnet, and said magnetic means including yoke elements extending in two paths from the other pole of said permanent magnet towards said coil but forming an air gap therebetween.

11. A mechanism according to claim 10, including means for flowing current intermittently through said conductive material so that the speed of movement of said stylus can be regulated.

12. A memchanism according to claim 11, said means for flowing current serving to intermittently reverse the direction thereof.

* * * * *